(12) United States Patent
Goto et al.

(10) Patent No.: US 6,714,293 B2
(45) Date of Patent: Mar. 30, 2004

(54) EXPOSURE METER

(75) Inventors: Yasushi Goto, Osaka (JP); Yoshio Yuasa, Osaka (JP)

(73) Assignee: Minolta Co., Ltd., Osaka (JP)

( * ) Notice: Subject to any disclaimer, the term of this patent is extended or adjusted under 35 U.S.C. 154(b) by 182 days.

(21) Appl. No.: 09/948,096

(22) Filed: Sep. 7, 2001

(65) Prior Publication Data

US 2002/0030806 A1 Mar. 14, 2002

(30) Foreign Application Priority Data

Sep. 14, 2000 (JP) ........................................ 2000-280381
Sep. 14, 2000 (JP) ........................................ 2000-280382

(51) Int. Cl.[7] .................................................. G01J 1/42
(52) U.S. Cl. ....................... 356/219; 356/218; 396/287; 396/292
(58) Field of Search ............... 356/218–225; 396/287, 292

(56) References Cited

U.S. PATENT DOCUMENTS

| | | | | |
|---|---|---|---|---|
| 4,203,668 A | * | 5/1980 | Chapman | 356/215 |
| D259,198 S | * | 5/1981 | Chapman | D16/39 |
| 4,364,662 A | | 12/1982 | Yuasa et al. | |
| 4,401,386 A | * | 8/1983 | Yuasa et al. | 356/226 |
| 4,483,601 A | * | 11/1984 | Sekida et al. | 354/288 |
| 4,748,468 A | * | 5/1988 | Fujino et al. | 354/402 |
| 5,486,914 A | * | 1/1996 | Denove et al. | 356/221 |
| 5,678,079 A | * | 10/1997 | Ogawa | 396/234 |
| 5,784,654 A | * | 7/1998 | Saito | 396/104 |
| D432,555 S | * | 10/2000 | Mitsui | D16/238 |
| 6,509,963 B2 | * | 1/2003 | Oda et al. | 356/218 |

FOREIGN PATENT DOCUMENTS

JP  707-15160  * 6/1995  ............. G07J/1/02

* cited by examiner

Primary Examiner—Frank G. Font
Assistant Examiner—Layla Lauchman
(74) Attorney, Agent, or Firm—Morrison & Foerster LLP

(57) ABSTRACT

An exposure meter has both function of an incident light type exposure meter for measuring an exposure value of an object by an incident light to the object and a reflected light type exposure meter for measuring exposure value of the object by a reflected light from the object. A latitude of a film is calculated from the exposure value by the incident light. The exposure value by the incident light and an upper and a lower limit values of the latitude are displayed on a display device. At least one exposure value measured by the reflected light is further displayed on the display device comparably with the latitude.

20 Claims, 14 Drawing Sheets

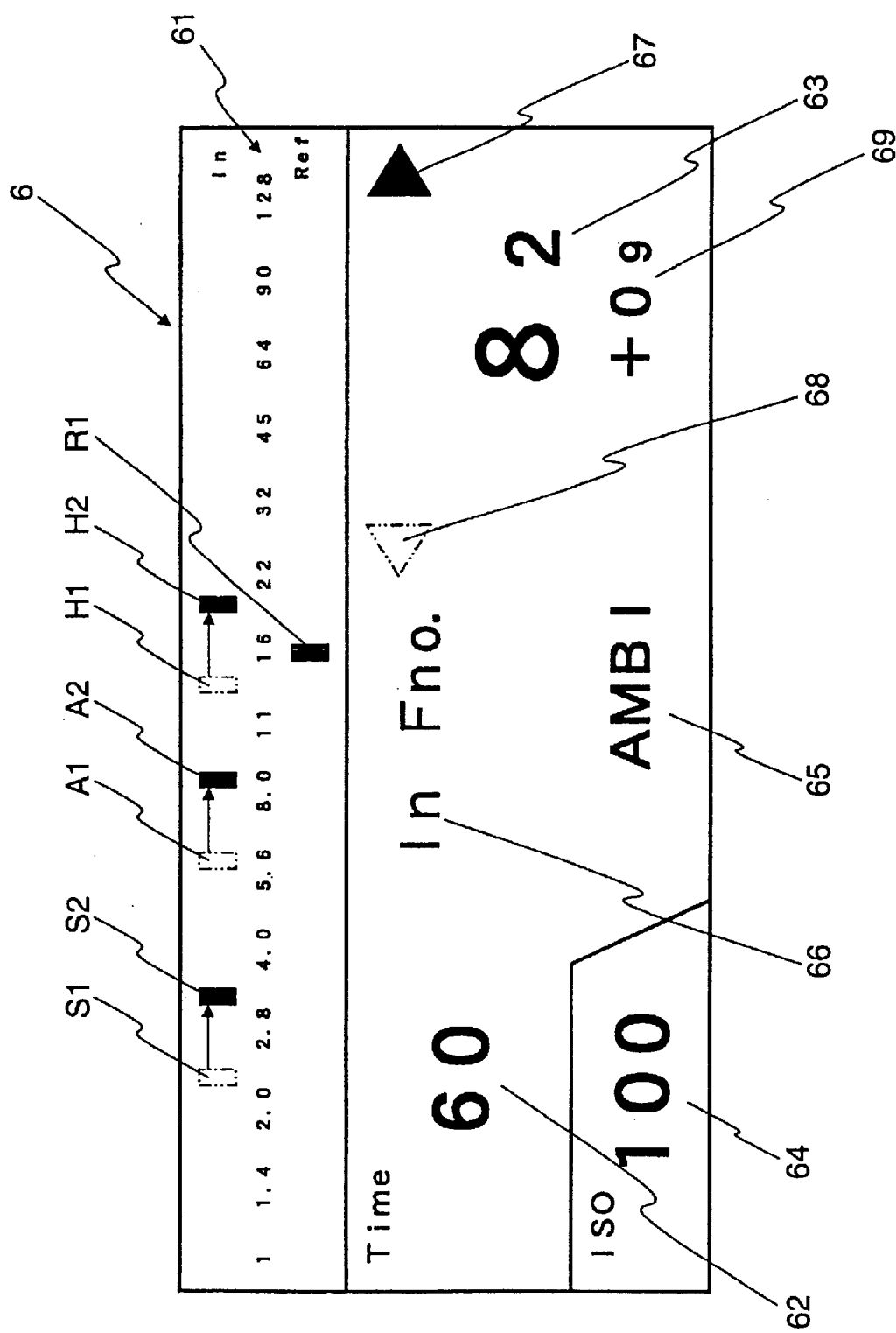

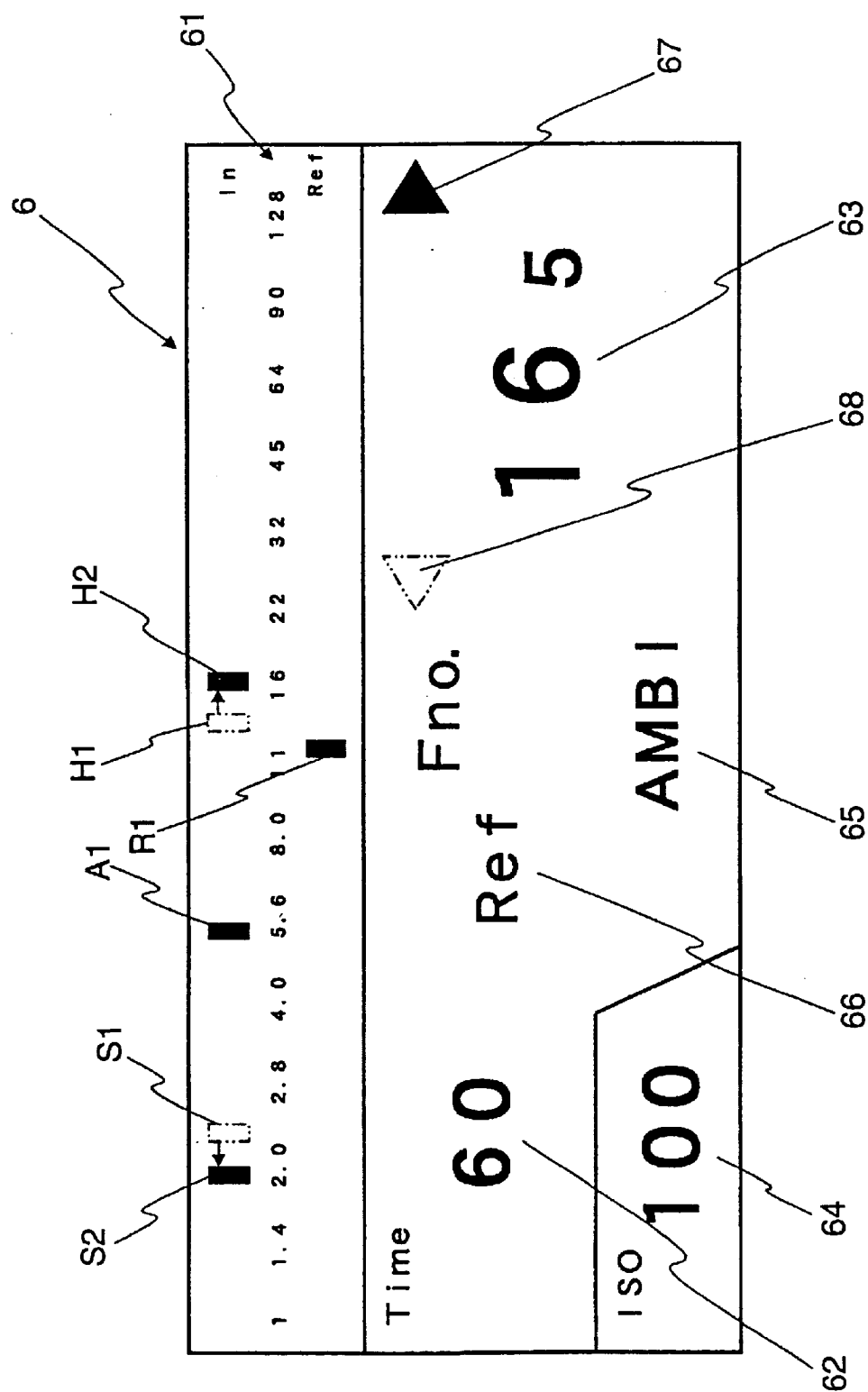

EXPOSURE METER

This application claims priority from Japanese Patent Application Nos. 2000-280381 and 2000-280382, the contents of which are hereby incorporated by references.

BACKGROUND OF THE INVENTION

1. Field of the Invention

The present invention relates to an exposure meter which measures an illuminance of an object by detecting incident light to the object and detecting light reflected from the object.

2. Description of the Related Art

There are two types of conventional exposure meters, namely an incident light exposure meter and a reflected light exposure meter. The incident light exposure meter directly measures the intensity of the incident light illuminating an object. The reflected light exposure meter measures the intensity of the light reflected from the object. The incident light exposure meter or the reflected light exposure meter is selected for deciding exposure conditions such as a shutter speed and an aperture number of a taking lens of a camera depending on the type of the object and its photographic conditions.

When a contrast of the object is high, it is difficult to include the highlight portion having the highest illuminance value (or the largest exposure value) and the shadow portion having the lowest illuminance value (or the smallest exposure value) of the object within the photographic latitude of a film. In such a case, it is necessary to decide which range of the measured exposure values of the object should be within the latitude of the film. For this purpose, the exposure values must be measured by the reflected light exposure meter at several portions on the object.

It is impossible to use the incident light exposure meter to distinguish the exposure values on different points of the object, since a photo-sensing window of the incident light exposure meter is configured to face the light source. On the other hand, the reflected light exposure meter used for measuring local exposure values of the object has a disadvantage. That is, it cannot measure the illuminance of the object precisely, since the exposure calculation is based on an assumption that the reflectance of the object has a predetermined standard value, for example, 18%. When the reflectance of the object is higher than the standard value, such as is the case with a white object, the exposure value calculated by the reflected light exposure meter is larger than the proper exposure value so that the color of the object is too dark when a photograph of the object is taken under the calculated exposure value. Similarly, when the reflectance of the object is lower than the standard value, such as is the case with a black object, the exposure value calculated by the reflected light exposure meter is smaller than the proper exposure value so that the color of the object is too bright when a photograph of the object is taken under the calculated exposure value. Thus, it is preferable to determine a proper exposure condition of a camera based on the exposure values measured by both the incident light exposure meter and the reflected light exposure meter.

To take into account the exposure values measured by the incident light exposure meter and the reflected light exposure meter, the exposure value of the object is first measured by the incident light exposure meter, which is then used as a preliminary exposure value for calculating the latitude of the film to be used. Subsequently, the exposure values are measured by the reflected light exposure meter at several important portions on the object. Then, it is determined whether the exposure values measured by the reflected light exposure meter are included in the latitude of the film. Since the exposure values measured by the incident light exposure meter and the reflected light exposure meter are respectively displayed on different display devices of the exposure meters, it is troublesome and difficult to compare the exposure values and to recognize the relationship between them. Especially, when the exposure values measured by the reflected light exposure meter are not included in the latitude or barely included in the latitude, it is necessary to adjust the preliminary exposure value measured by the incident light exposure meter. In such a case, the exposure values displayed on the different the display meters make it difficult to perform such an adjustment of the preliminary exposure value.

SUMMERY OF THE INVENTION

A purpose of the present invention is to provide an exposure meter having both an incident light exposure meter and reflected light exposure meter so that the two types of exposure values measured by the two exposure meters can be compared easily. Another purpose of the present invention is to provide an exposure meter having both an incident light exposure meter and a reflected light exposure meter so that the exposure values measured by the reflected light exposure meter can be easily compared to a latitude of a light sensing member calculated based on the exposure value measured by the incident light exposure meter.

An exposure meter in accordance with an aspect of the present invention includes a first meter portion measuring an exposure value based on incident light illuminating an object, a second meter portion measuring an exposure value based on reflected light from the object and a display portion displaying the exposure values measured by the first meter portion and the second meter portion for comparison thereof.

In this configuration, the exposure values measured by the first meter portion and the second meter portion are displayed on the same display to compare easily the exposure values measured at several portions of the object based on the reflected light with the exposure value of the object based on the incident light.

A second exposure meter in accordance with an aspect of the present invention includes a first meter portion measuring an exposure value based on incident light illuminating an object, a second meter portion measuring an exposure value based on reflected light from the object and a calculator portion calculating a latitude of a light sensing member based on the exposure value measured by the first meter portion.

In this configuration, the latitude of the film, which is used for taking a photograph, is calculated by the calculator portion based on the exposure value measured by the first meter portion so as to compare easily the exposure values measured at several portions of the object based on the reflected light with the latitude.

As a result, it is easy to determine an exposure condition in which the highlight portion and the shadow portion of the object are included in the latitude of the film.

BRIEF DESCRIPTION OF THE DRAWINGS

FIG. 13 is a front view showing still another example of the display on the display device of the exposure meter of FIG. 1, when a preliminary exposure value is adjusted; and FIG. 14 is a front view showing still another example of the display on the display device of the exposure meter of FIG. 1, when widths of a latitude of a film are adjusted.

DETAILED DESCRIPTION OF THE EMBODIMENT

An embodiment of the present invention is described with reference to the figures.

Figure 1:
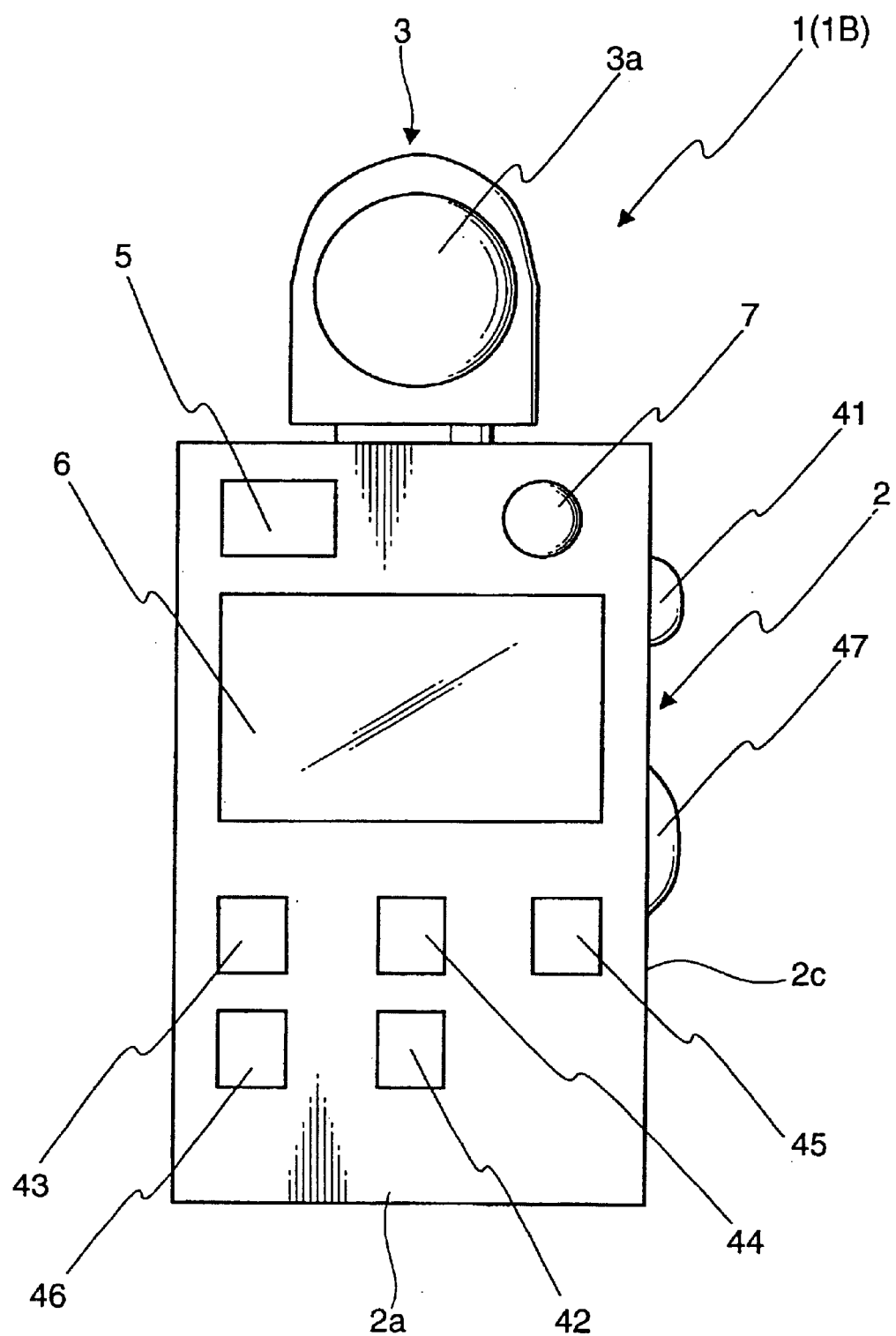
FIG. 1 is a front view of an exposure meter in accordance with an embodiment of the present invention.
Figure 2:
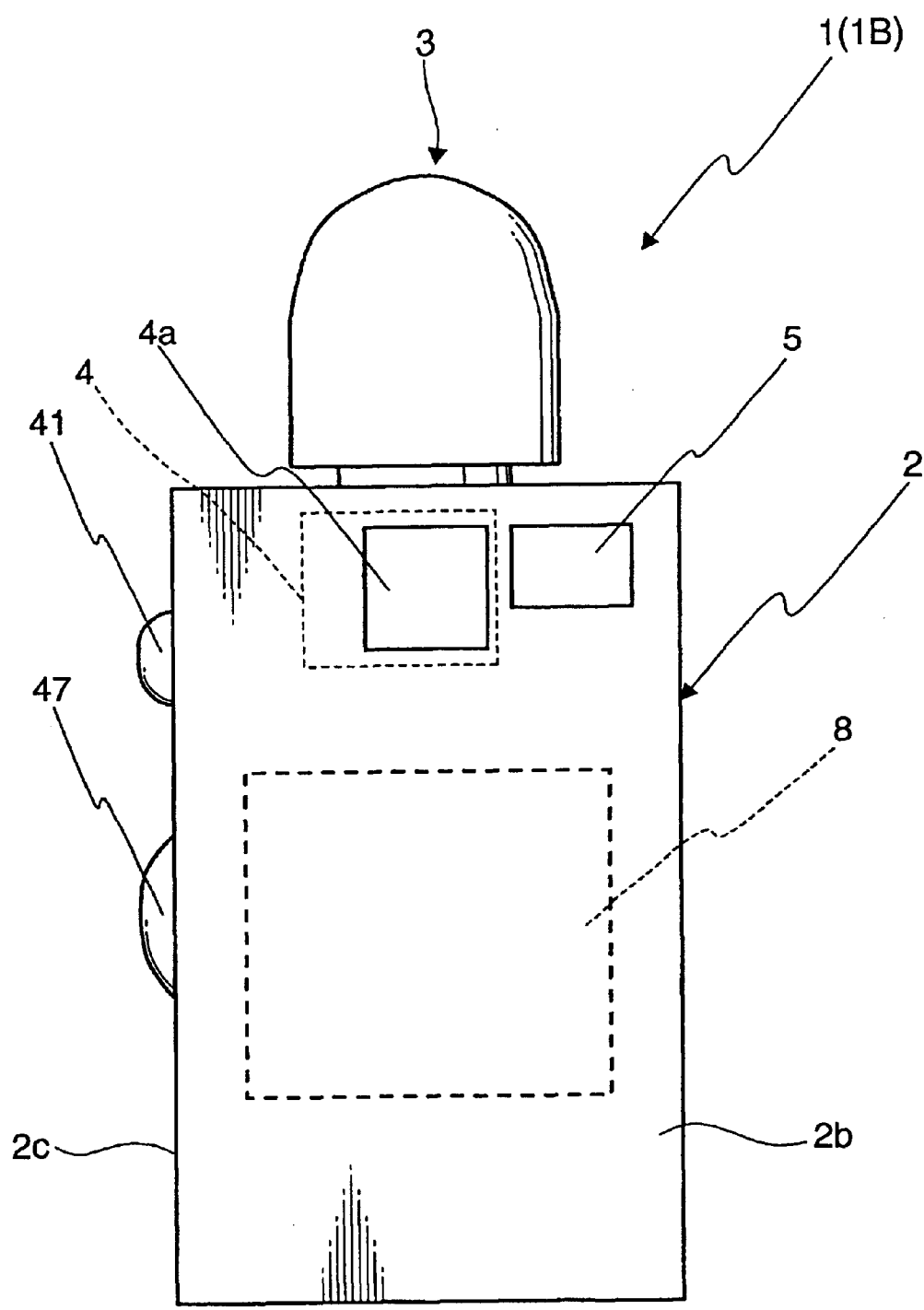
FIG. 2 is a rear view of the exposure meter of FIG. 1.

A front view and a rear view of an exposure meter 1 in accordance with an embodiment of this invention are shown in FIGS. 1 and 2, respectively. The exposure meter 1 is configured to measure an exposure or illuminance values of an object by using both incident light illuminating the object and reflected light of the object, i.e., the incident light reflected from the object.

As shown FIG. 1, an incident light type photo-sensing unit 3 including a photo-sensing sphere 3a is mounted on a main body 2 of the exposure meter 1. The photo-sensing sphere 3a is placed substantially on the same plane as the front face 2a of the main body 2. A view finder 5 for observing an area at which an exposure value is to be measured is provided at an upper left portion of the front face 2a of the main body 2. A display portion 6 such as a liquid crystal display is provided substantially at the center of the front face 2a of the main body 2, on which information such as a measurement result and the like are displayed. A main switch 7 for switching on or off the electric power of the exposure meter 1 is provided at the upper right portion of the front face 2a of the main body 2. A plurality of switches 42 to 46 are arranged below the display portion 6 on the front face 2a of the main body 2. For example, the switch 42 is a function switch for selecting the functions of the exposure meter 1, i.e., the incident light type exposure meter unit and the reflected light type exposure meter unit.

As shown FIG. 2, a window 4a of a reflected light type photo-sensing unit 4 is provided at an upper center of a rear face 2b of the main body 2. A main control unit 8 including a CPU, a RAM, a ROM and the like is provided inside the main body 2. An operation switch 41 and a control dial 47 are provided on a side face 2c of the main body 2. The operation switch 41 is pushed down for switching on or off the measurement of the exposure value. When the operation switch 41 is pushed down, the exposure value or the illuminance of the object is measured.

Figure 3:
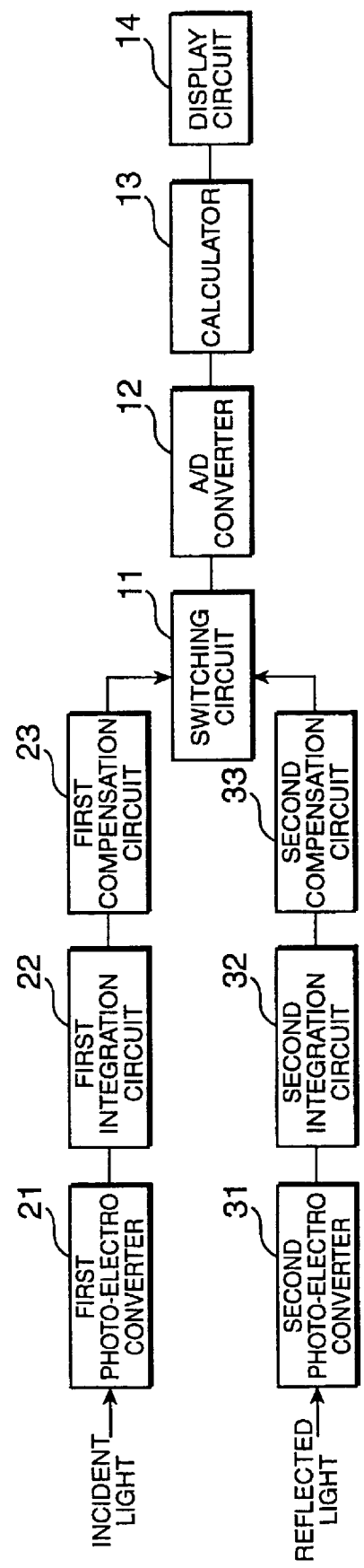
FIG. 3 is a block diagram showing a configuration of the exposure meter of FIG. 1.

A block diagram of the exposure meter 1 is shown in FIG. 3. An incident light system includes a first photo-electro converter 21, such as a photodiode, for converting light energy of the incident light to a current signal, a first integration circuit 22 for converting the current signal to a voltage signal, and a first compensation circuit 23 for compensating a sensitivity of measurement by amplifying the voltage of the voltage signal outputted from the first integration circuit 22. Similarly, a reflected light system includes a second photo-electro converter 31 for converting light energy of the reflected light from the object to a current signal, a second integration circuit 32 for converting the current signal to a voltage signal, and a second compensation circuit 33 for compensating a sensitivity of measurement by amplifying the voltage of the voltage signal outputted from the second integration circuit 32.

The first compensation circuit 23 and the second compensation circuit 33 are both connected to a switching circuit 11. The switching circuit 11 alternatively selects the function of the incident light type exposure meter unit or the function of the reflected light type exposure meter unit, in response to the operation of the function switch 42. An A/D converter 12 connected to the switching circuit 11 converts the analog voltage signals from the first compensation circuit 23 and the second compensation circuit 33 to digital signals. A calculator 13 connected to the A/D converter 12 calculates not only exposure values of the object corresponding to output signals of the A/D converter 12 but also a latitude based on the exposure value corresponding to the output signal from the incident light system. The exposure values and upper and lower limit values of the latitude are inputted to a display circuit 14 for displaying them on the display portion 6.

When the exposure meter 1 is used as the incident light type exposure meter, the exposure meter 1 is positioned so that the photo-sensing sphere 3a faces a light source of an illumination light such as the sun. The light energy of the incident light passes through the photo-sensing sphere 3a and reaches the first photo-electro converter 21 provided behind the photo-sensing sphere 3a in the incident light type photo-sensing unit 3. The output signal from the first photo-electro converter 21 is processed as described above, and the exposure value of the object and the upper and lower limit values of the latitude based on the incident light of the illumination light are displayed on the display portion 6.

When the exposure meter 1 is used as the reflected light type exposure meter, the exposure meter 1 is positioned so that the window 4a of the reflected light type photo-sensing unit 4 and the view finder 5 face the object. The light energy of the reflected light from the object passes through the window 4a and reaches the second photo-electro converter 31 provided behind the window 4a in the reflected light type photo-sensing unit 4. The output signal from the second photo-electro converter 31 is processed as described above, and the exposure values of the object based on the reflected light from the object are displayed on the display portion 6.

The display circuit 14 includes a memory for storing a plurality of exposure values and the upper and lower limit values of the latitude. For example, when several points on the object are measured by the reflection light type exposure meter unit, the exposure values corresponding to the measured points are stored in the memory and are displayed on the display portion 6 at the same time.

Figure 4:
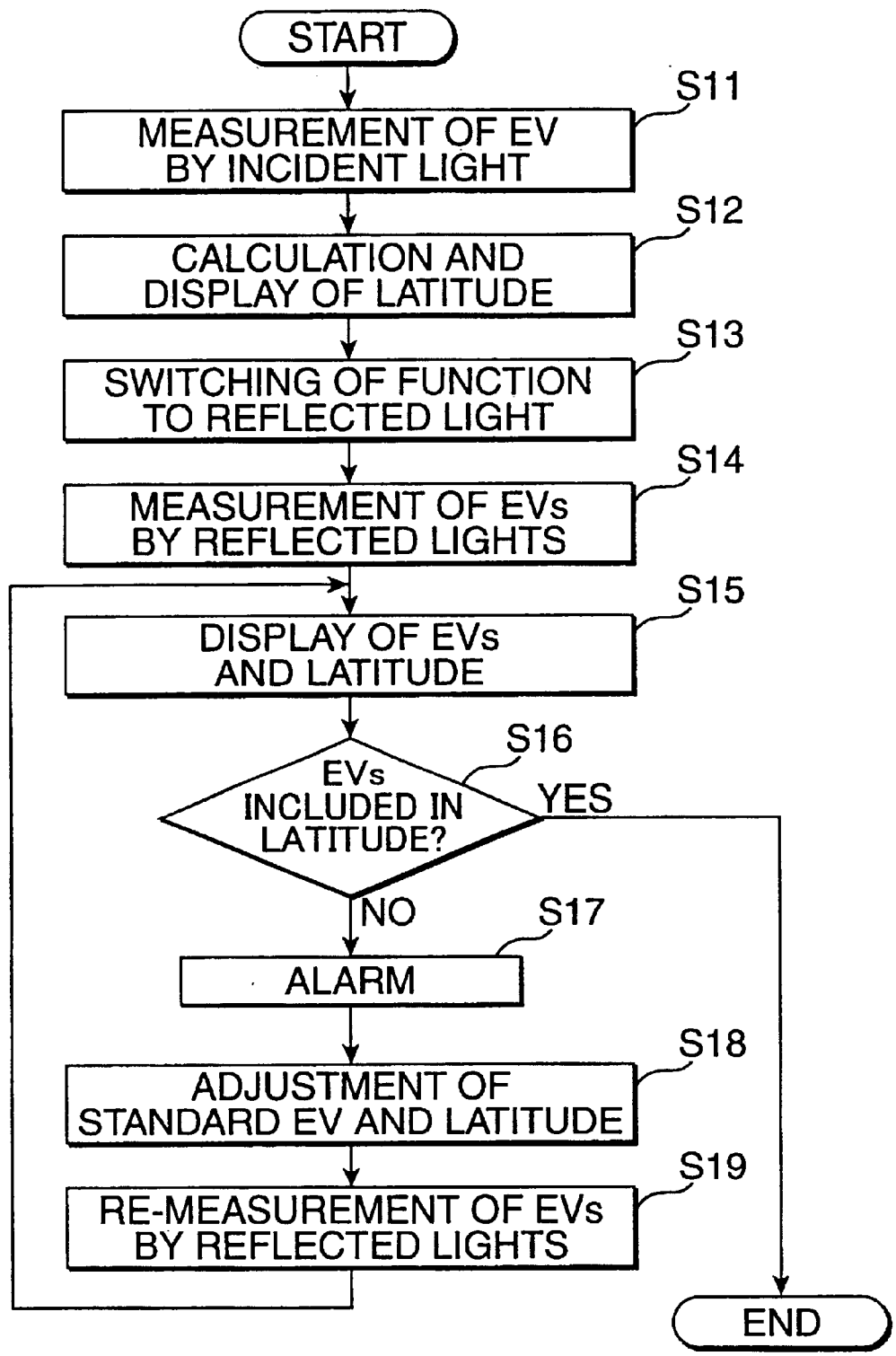
FIG. 4 is a flowchart showing an operation of the exposure meter of FIG. 1 for deciding an exposure condition of a photograph.

An operation of the exposure meter 1 for deciding an exposure condition of taking a photograph will be described with reteference to the flowchart shown in FIG. 4.

At first, the exposure value of the object is measured by the incident light type exposure meter unit (Step S11). The function of the incident light type exposure meter unit of the exposure meter 1 is selected by operating the function switch 42. The exposure value based on the incident light is used as a preliminary exposure value for calculating the upper and lower limit values of the latitude. The calculated upper and lower limit values of the latitude are displayed on the display portion 6 (Step S12).

Subsequently, the reflected light type exposure meter unit is switched on by operating the function switch 42 (Step S13). At least one, preferably a plurality of important points on the object are measured using reflected light from the object for calculating the exposure value (Step S14).

The exposure value (EV) and the upper and lower limit values of the latitude based on the incident light and the exposure values (EVs) based on the reflected light are both displayed on the display portion 6 or in the view finder 5 (Step S15) for easy comparison. These values are not necessarily displayed at the same time, as long as they are compared easily.

When the exposure values are calculated, the main control unit 8 determines whether the exposure values (EVs) based on the reflected lights from the important portions of the object are included in the upper and lower limit values of the latitude based on the incident light or not (Step S16).

When at least one exposure value of the important portion of the object is not included in the latitude (NO in Step S16), the main control unit 8 outputs an alarm (Step S17). When the alarm is outputted, the user can adjust the preliminary exposure value and the upper and lower limit values of the latitude corresponding to his taste (Step S18).

Preferably, the exposure values of the important portions of the object are measured again using the reflected light (Step S19). The exposure values newly measured and the adjusted latitude are displayed on the display portion 6 or in the viewfinder 5 (Step S15). It is determined whether the exposure values newly measured are included in the adjusted latitude or not (Step S16). When the exposure values of the important portions on the object are included in the latitude or the adjusted latitude (YES in Step S16), the preliminary exposure value or the adjusted preliminary exposure value can be used as the exposure value for taking a photograph of the object.

Figure 5:
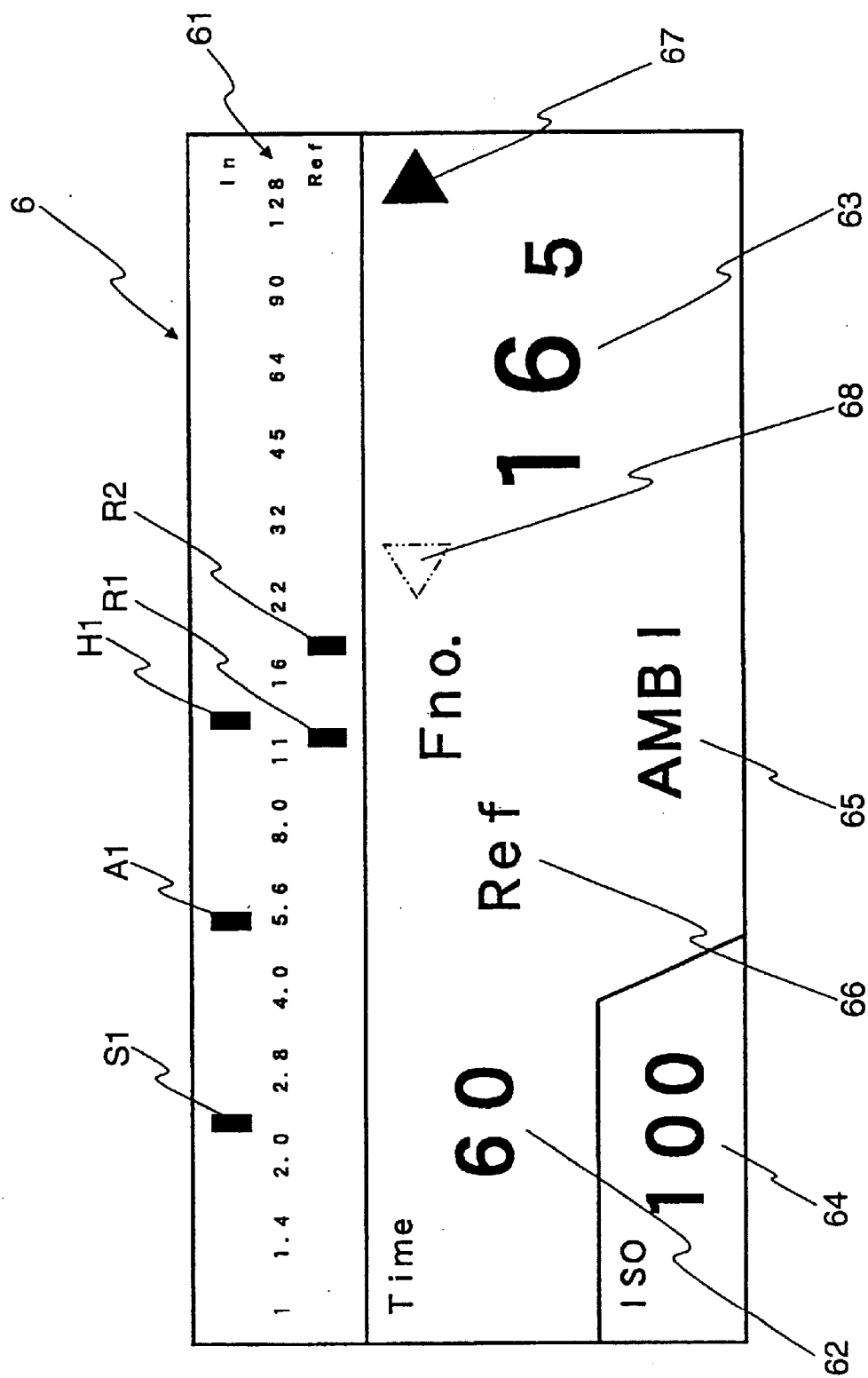
FIG. 5 is a front view showing an example of a display on a display device of the exposure meter of FIG. 1.

FIG. 5 shows an example of the display on the display portion 6. In this example, the preliminary exposure value A1 as well as the upper limit value H1 and the lower limit value S1 of the latitude are displayed above an analog scale 61 positioned in the horizontal direction of the display. The exposure values R1, R2 . . . of the important portions on the object are displayed below the analog scale 61. All these markers are placed at the upper portion of the display portion 6. The display portion also shows a shutter speed (exposing time) 62, an aperture number 63, a sensitivity of a film 64 by ISO standard, a light indicator 65 for identifying the kind of the illumination light, such as ambient light "AMBI" or flash light "FLASH," and a function indicator 66 for identifying the function of the exposure meter 1, i.e., the incident light exposure meter unit, "In," or the reflected light exposure meter unit, "Ref".

Hereupon, the calculation of the upper and lower limit values of the latitude is described. For example, when a film to be used has a latitude of 5 steps of the exposure value (5EV) by APEX indication, the upper region of the latitude with respect to the preliminary exposure value may be selected to be 2.3 steps of the exposure value (+2.3EV) and the lower region of the latitude may be selected to be 2.7 steps of the exposure value (−2.7EV). When the preliminary exposure value is EV10, the upper limit value H1 of the latitude is EV12.3 (EV10+2.3EV=EV12.3) and the lower limit value S1 is EV7.3 (EV10−2.7EV=EV7.3).

In the example shown in FIG. 5, since the exposure value R2 based on the reflected light is larger than the upper limit value H1 of the latitude, the main control unit 8 displays an alarming mark 67 for showing the overexposure. Alternatively, when any exposure value based on the reflected light is smaller than the lower limit value S1 of the latitude, another alarming mark 68 showing the underexposure will be displayed. Because of the alarming, the user realizes that the current preliminary exposure value is improper for taking a properly exposed photograph. The method for alarming the improper exposure is not limited to the alarming marks 67 and 68. It is possible to output an alarming sound, an blinking sign or the like.

As described above, the preliminary exposure value A1 based on the incident light, the upper limit value H1 and the lower limit value S1 of the latitude are displayed on the display portion 6 with the exposure values R1, R2 . . . measured at the important portions of the object so that it is easy to find the exposure value to be used for taking a photograph, which has the exposure values at the important portions of the object within the latitude of the film. Furthermore, the relationship between the latitude and the exposure values at the important portions of the object is displayed with the analog scale so that it is easy to adjust the preliminary exposure value so as to include the exposure values at the important portions of the object within the latitude of the film.

Figure 6:
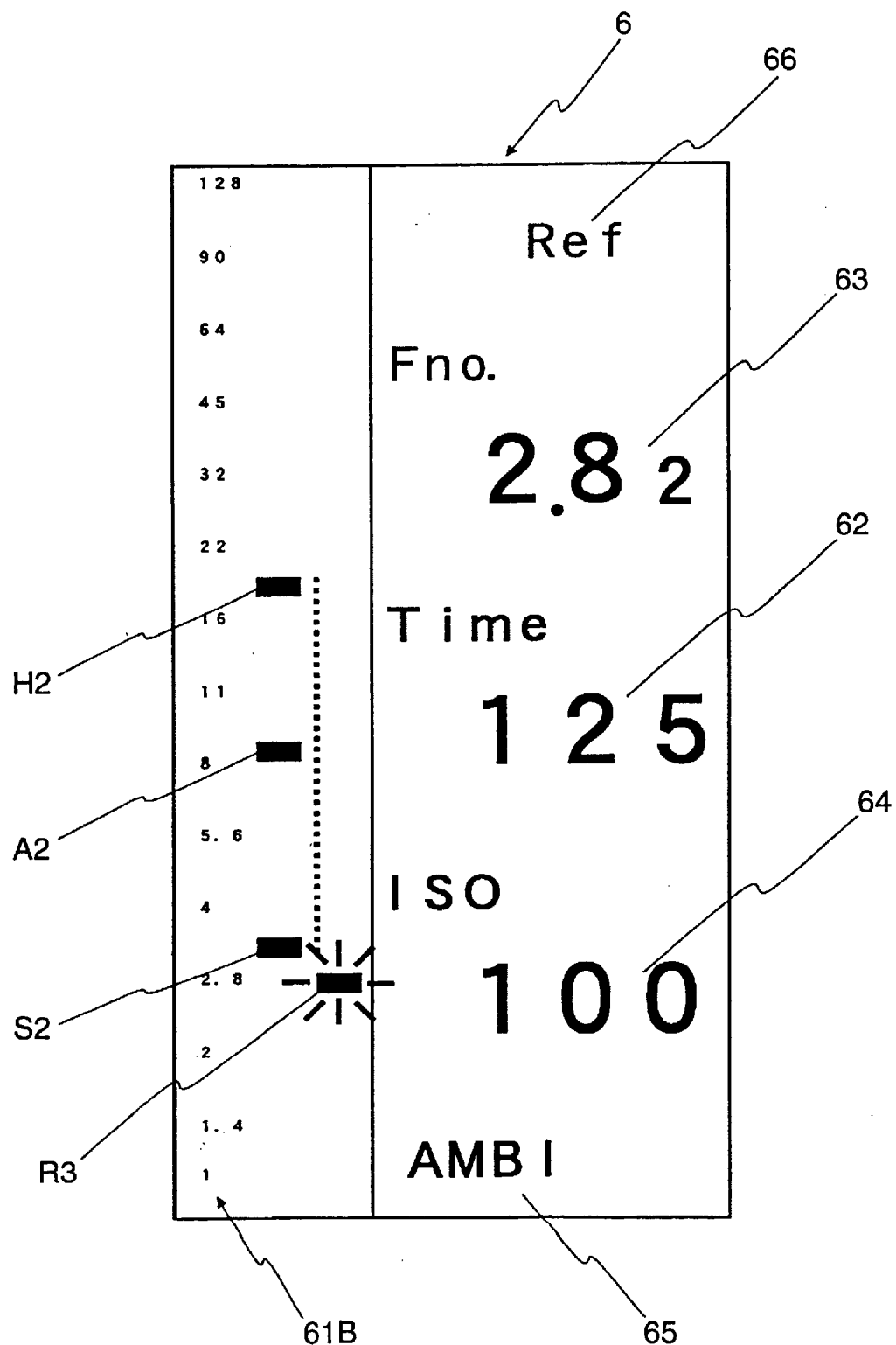
FIG. 6 is a front view showing another example of the display on the display device of the exposure meter of FIG. 1.

FIG. 6 shows another example of the display of the display portion 6. In this example, the preliminary exposure value A2, the upper limit value H2 and the lower limit value S2 of the latitude are displayed on the right side of an analog scale 61B positioned in the vertical direction. The exposure values R3 . . . of the important portions on the object are displayed further on the right side of the analog scale 61B. Since the exposure value R3 based on the reflected light is smaller than the lower limit value S2 of the latitude, the main control unit 8 alarms the user of the underexposure by blinking the lighting of the exposure value R3.

Figure 7:
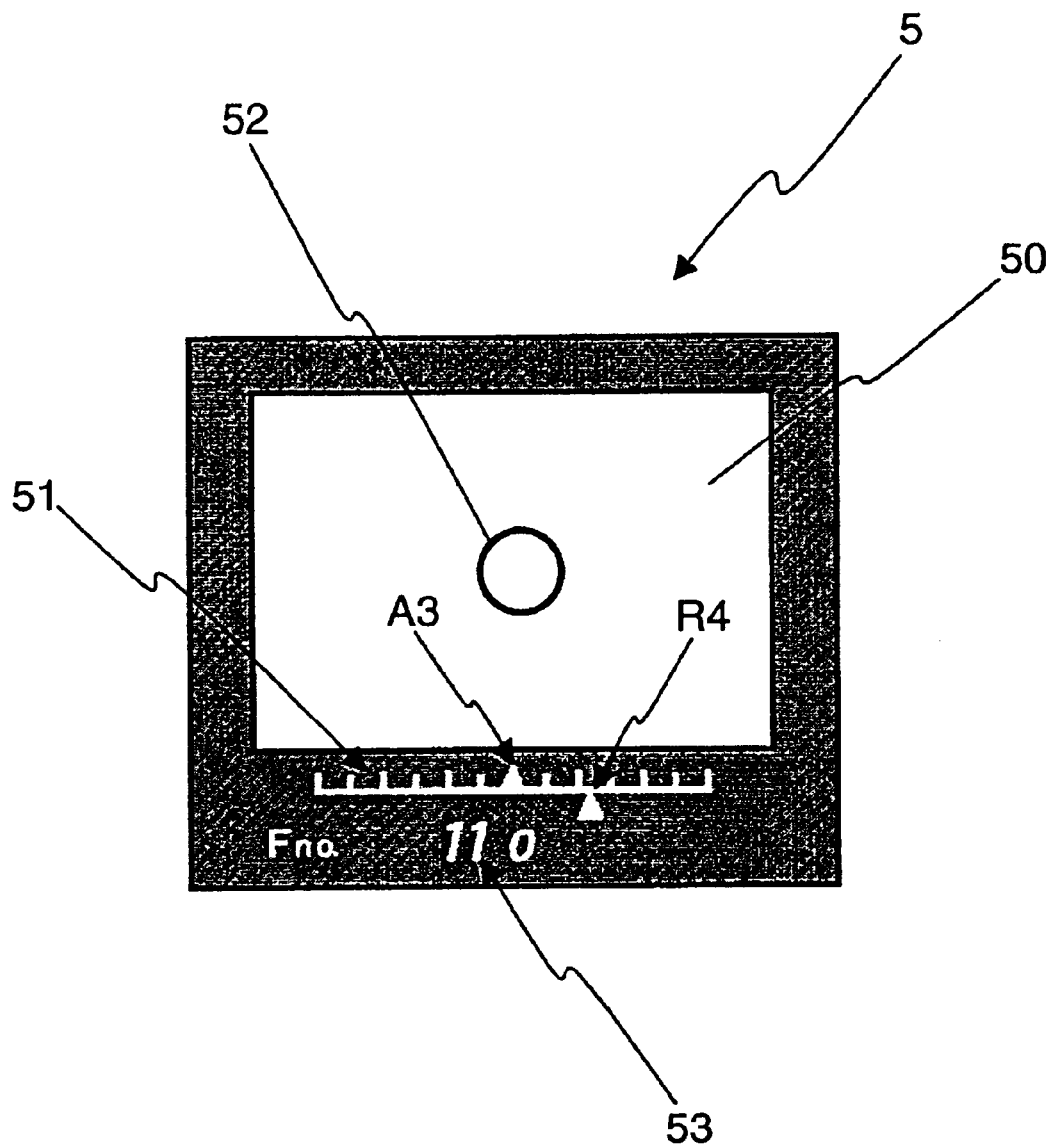
FIG. 7 is a front view showing an example of a display in a viewfinder of the exposure meter of FIG. 1.

FIG. 7 shows an example of the display in a viewfinder 5 which is used for measuring the exposure values by the reflected light type exposure meter unit. A spot circle 52 for targeting a measuring area is placed at the center of a rectangular frame 50. A lateral analog scale 51 is positioned below the frame 50. With respect to the scale 51, the preliminary exposure value A3 based on the incident light and the exposure value R4 based on the reflected light are indicated by respective marks, "Δ". Furthermore, the aperture number (Fno.) 53, which is calculated from the exposure values based on the reflected light, is numerically displayed below the analog scale 51.

Figure 8:
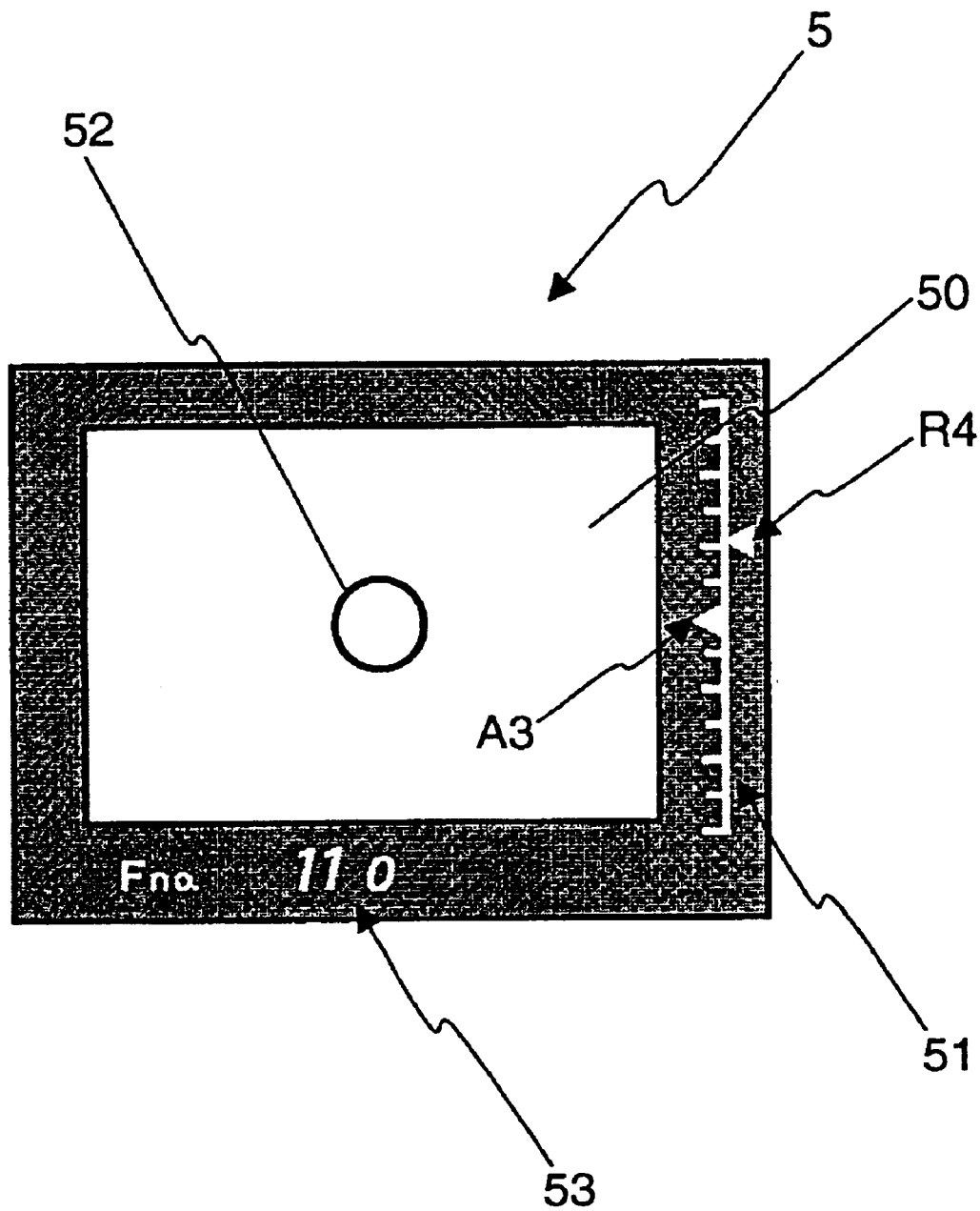
FIG. 8 is a front view showing another example of the display in the viewfinder of the exposure meter of FIG. 1.

FIG. 8 shows another example of the display in the viewfinder 5. A vertical analog scale 51 is positioned on the right side of the frame 50. Along the scale 51, the preliminary exposure value A3 based on the incident light and the exposure value R4 based on the reflected light are indicated by respective marks, "Δ". The aperture number (Fno.) 53 is numerically displayed below the analog scale 51.

In the examples shown in FIGS. 7 and 8, it is preferable to display the upper and lower limit values of the latitude with respect to the analog scale 51. Alternatively, the length of the analog scale 51 may correspond to the width of the latitude.

Figure 9:
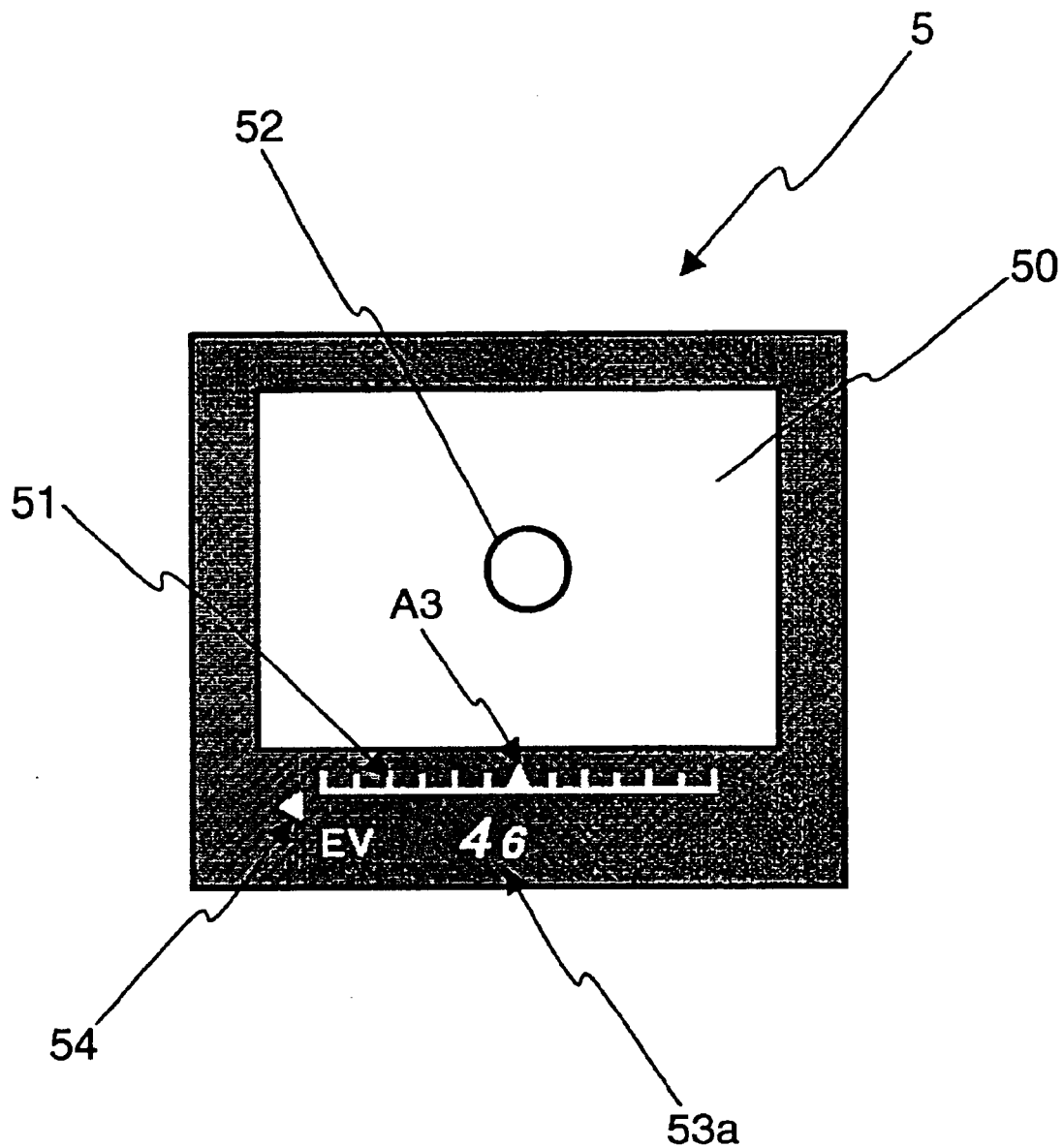
FIG. 9 is a front view showing still another example of the display in the viewfinder of the exposure meter of FIG. 1.

FIG. 9 shows still another example of the display in the viewfinder 5. The exposure value (EV) 53a is numerically displayed below the analog scale 51, instead of the aperture number (Fno.) 53 which is displayed in the device shown in FIG. 7. In the example shown in FIG. 9, the exposure value based on the reflected light is smaller than the lower limit value of the latitude so that an alarming mark 54 is lit up for showing the underexposure.

Figure 10:
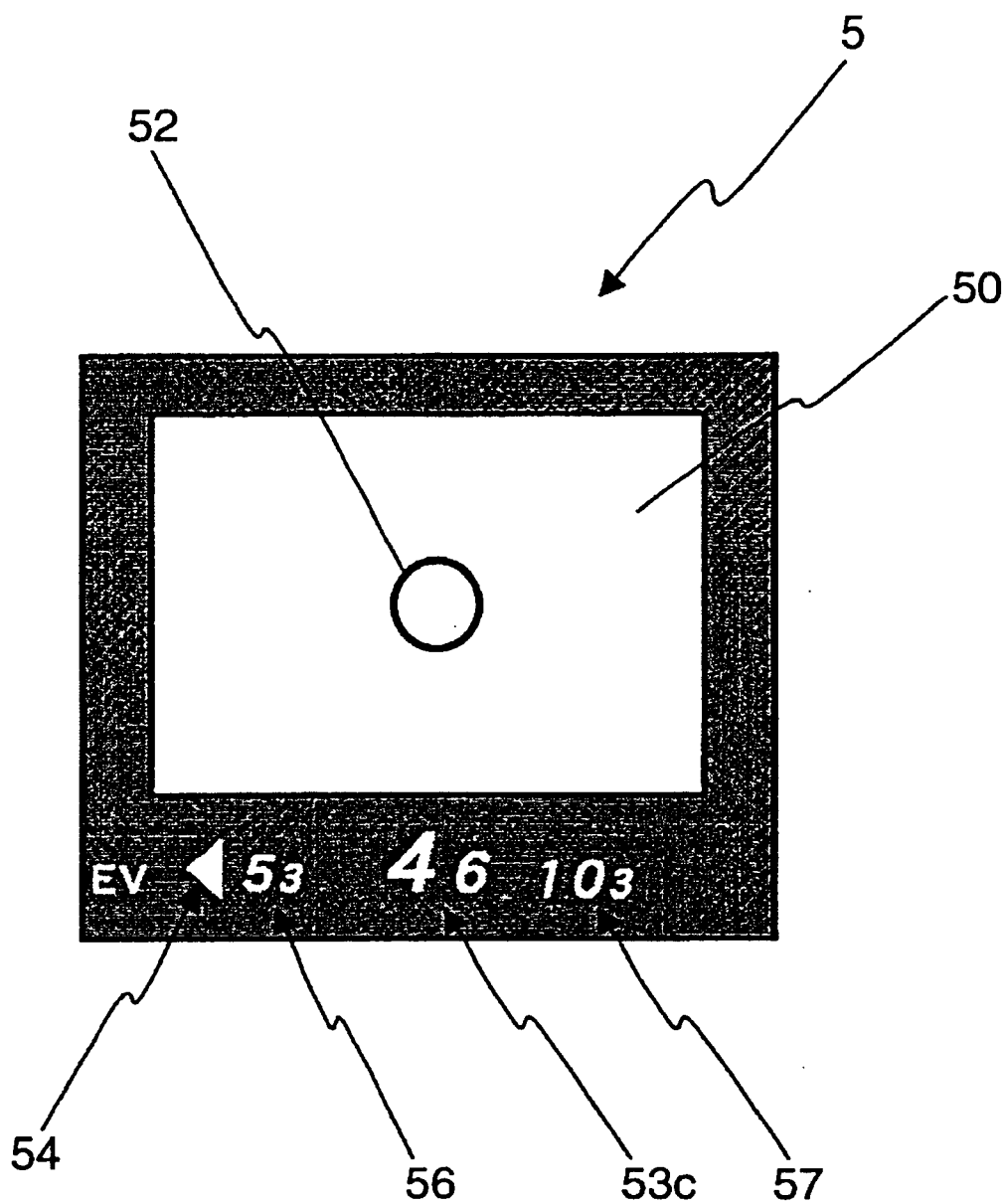
FIG. 10 is a front view showing still another example of the display in a viewfinder of the exposure meter of FIG. 1.

FIG. 10 shows still another example of the display in the viewfinder 5. In this example, the exposure value 53c based on the reflected light is numerically displayed below the frame 50. The upper limit value 57 and the lower limit value 56 of the latitude are numerically displayed at both sides of the exposure value 53c. No analog scale is displayed. In this example, the alarming mark 54 indicates the underexposure, since the exposure value 53c displayed between the two limits is smaller than the lower limit value 56. Since the exposure value and the upper and lower limit values of the latitude are numerically displayed, the user can easily recognize the relationship between the exposure value at the important portion of the object and the latitude of the film.

As described above, since the preliminary exposure value based on the incident light and/or the upper and lower limit values of the latitude is/are displayed in the view finder in the examples shown in FIGS. 7 to 10, the user can determine easily whether the exposure value at the important portion of the object is included in the latitude when he measures the exposure value at important portion of the object through the viewfinder 5.

The calculation of the exposure values is described below. The exposure value (EV) based on the incident light and measured by the incident light type exposure meter unit satisfies the following equation:

$$2^{EV} = A^2/T = ES/C \quad (1)$$

The symbol "A" denotes the aperture number (Fno.). The symbol "T" denotes the shutter speed or the exposing time. The symbol "E" denotes an illuminance at the photo-sensing sphere 3a of the incident light type photo-sensing unit 3. The symbol "S" denotes a sensitivity (or an exposure index) of a film. The symbol "C" denotes a compensation factor for compensating the sensitivity of the exposure meter in the incident light type exposure meter unit.

The exposure value (EV) based on the reflected light and measured by the reflected light type exposure meter unit satisfies the following equation:

$$2^{EV} = A^2/T = LS/K \quad (2)$$

The symbol "A" denotes the aperture number (Fno.). The symbol "T" denotes the shutter speed or the exposing time. The symbol "L" denotes a luminance of a light source which is used in the calibration of the exposure meter. The symbol "S" denotes a sensitivity (or an exposure index) of a film. The symbol "K" denotes a compensation factor for compensating the sensitivity of the exposure meter in the reflected light type exposure meter unit.

In the exposure meter 1 having both the incident light type exposure meter unit and the reflected light type exposure meter unit, it is necessary to adjust the compensation factors "C" and "K" with a preferable balance.

Figure 11:
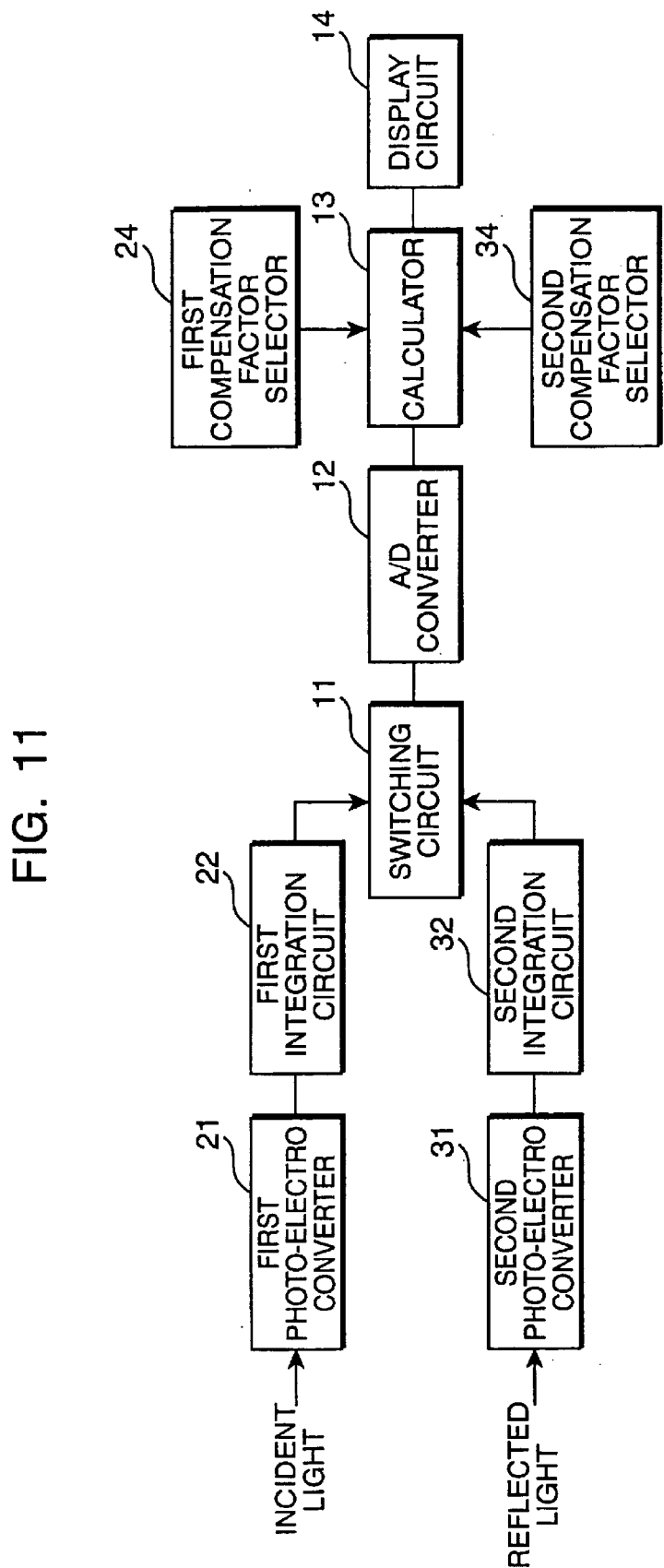
FIG. 11 is a block diagram showing a modification of the exposure meter of FIG. 1.

A modification of the block diagram of the exposure meter 1 is shown in FIG. 11, in which the compensation factors "C" and "K" are adjusted independently.

An incident light system includes a first photo-electro converter 21 for converting the energy of the incident light to a current signal, and a first integration circuit 22 for converting the current signal to a voltage signal. Similarly, a reflected light system includes a second photo-electro converter 31 for converting the energy of the reflected light from an object to a current signal, and a second integration circuit 32 for converting the current signal to a voltage signal.

The first integration circuit 22 and the second integration circuit 32 are both connected to a switching circuit 11. The switching circuit 11 selects the incident light type exposure meter unit or the reflected light type exposure meter unit, in response to the operation of the function switch 42. An A/D converter 12 connected to the switching circuit 11 converts the analog voltage signals from the first integration circuit 22 and the second integration circuit 32 to digital signals. A calculator 13 connected to the A/D converter 12 calculates not only an exposure value of an object corresponding to output signals of the A/D converter 12 but also a latitude based on the exposure value corresponding to the output signal from the incident light system.

A first compensation factor selector 24 and a second compensation factor selector 34 are respectively connected to the calculator 13. The first compensation factor selector 24 provides the value of the compensation factor "C" used in the equation (1) when the switching circuit 11 selects the incident light system. The second compensation factor selector 34 provides the value of the compensation factor "K" used in the equation (2) when the switching circuit 11 selects the reflected light system. The exposure values and upper and lower limit values of the latitude calculated by the calculator 13 are inputted to a display circuit 14 for displaying them on the display portion 6.

In this configuration, the compensation factors "C" and "K" can be independently adjusted so that the sensitivities of the measurements with the incident light and the reflected light can be independently compensated by the adjusted compensation factors "C" and "K".

Generally, the exposure value provided by the incident light type exposure meter unit is calculated to meet a condition that an image of a standard object having a reflectance of 18% is reproduced in a film with its middle density. The exposure value provided by the reflected light type exposure meter unit is used so that an image of the important portion of the object is reproduced with the middle density. The middle density is defined as the density corresponding to the center of the effective exposure region along the logarithmic axis of a characteristic curve of a film.

Figure 12:
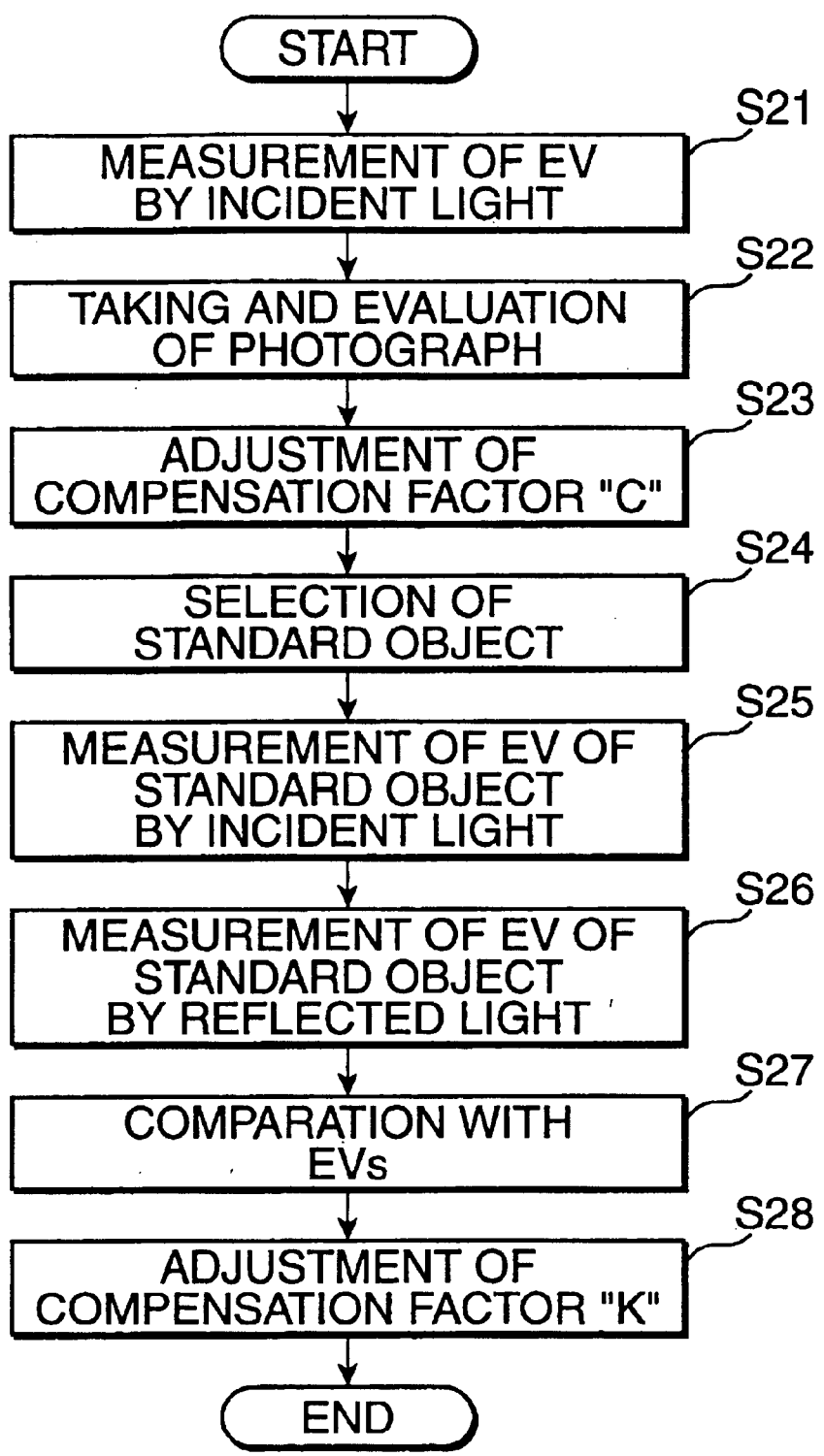
FIG. 12 is a flowchart showing a method for adjusting compensation factors "C" and "K" which are used for calculating the exposure values in the exposure meter of FIG. 1.

A method for adjusting the compensation factors "C" and "K" is described with reference to the flowchart shown in FIG. 12. The compensation factor "C" for the incident light type exposure meter unit is adjusted first.

At first, the exposure value of the object is measured by the incident light type exposure meter unit (Step S21). Subsequently, a photograph of the object is actually taken under the exposure condition decided by the exposure value, and the photograph is evaluated (Step S22). If the evaluation of the photograph is not satisfactory, the value of the compensation factor "C" is adjusted by the first compensation factor selector 24 corresponding to the user's taste (Step S23). The steps S21 to S23 can be repeated until the satisfying evaluation of a photograph is obtained.

When the compensation factor "C" is fixed, a standard object, which is used for matching the exposure value measured by the reflected light with the exposure value measured by the incident light, is selected (Step S24). Generally an object having a reflectance of 18% is selected. The exposure values of the standard object are measured by using the incident light and the reflected light (Steps S25 and S26). The exposure values measured with the incident light and the reflected light are compared with each other (Step S27). When the exposure values measured with the incident light and the reflected light are not equal, the compensation factor "K" is adjusted in a manner to match the two exposure values (Step S28).

The exposure values provided by the exposure meter are generally proper, since the above-mentioned compensation factors "C" and "K" are experimentally obtained. It, however, may not meet a specific photographic requirement, since the proper exposure for that requirement may vary depending on the photographing condition, user's tastes and so on. When a use has a different taste, it is preferable to adjust the compensation factors "C" and "K" so as to reflect the user's taste. For example, a standard object having a reflectance different from 18% may be used.

In the above-mentioned exposure meter 1 shown in FIG. 1, when a standard value setting switch 43 is switched on, the exposure value measured by the incident light type exposure meter unit is set as the preliminary exposure value A1. Simultaneously, the upper limit value H1 and the lower limit value S1 of the latitude are calculated using the preliminary exposure value A1. The preliminary exposure value A1, the upper and lower limit values H1 and S1 of the latitude are displayed on the display portion 6 and/or in the viewfinder 5.

For adjusting these values, the control dial 47 is rotated while a standard value adjusting switch 44 is pushed down. As shown in FIG. 13, the preliminary exposure value A1, and the upper and lower limit values H1 and S1 of the latitude are shifted together by the same quantity in the same direction corresponding to the rotation angle of the control dial 47. This operation puts the exposure value R1 at the important portion of the object within the latitude.

For adjusting the compensation factor "C" of the incident light type exposure meter unit, an adjusting mode switch 46 is repeatedly pushed down so as to select the mode for adjusting the compensation factor "C". Subsequently, the control dial 47 is rotated so that the compensation factor "C" is adjusted corresponding to the rotation angle of the control dial 47.

For adjusting the compensation factor "K" of the reflected light type exposure meter unit, the adjusting mode switch 46 is repeatedly pushed down so as to select the mode for adjusting the compensation factor "K", and the control dial 47 is rotated.

For adjusting the exposure value with the incident light and the associated position of the latitude, the adjusting mode switch 46 is repeatedly pushed down so as to select the mode for adjusting the exposure value with the incident light, and the control dial 47 is rotated.

For adjusting the widths of the latitude, the adjusting mode switch 46 is repeatedly pushed down so as to select the mode for varying the widths of the latitude, and the control dial 47 is rotated. For example, when the widths of the latitude, +2.3EV and −2.7EV, are selected with respect to the preliminary exposure value A1, and the preliminary exposure value is EV10, the upper limit value H1 of the latitude is EV12.3 and the lower limit value S1 of the latitude is EV7.3. When the control dial 47 is rotated so as to expand the widths of the latitude to +2.6EV and −3.0EV, respectively, with respect to the preliminary exposure value A1, the upper limit value H1 of the latitude is shifted to H2, EV12.6, and the lower limit value S1 of the latitude is shifted to S2, EV7.0, as shown in FIG. 14. Thus, since the width of the entire latitude is expanded, the exposure value R1 measured with the reflected light is included in the latitude.

As mentioned above, the exposure meter 1 in accordance with the embodiment of the present invention can adjust the preliminary exposure value measured with the incident light the widths of the latitude, the compensation factors "C" and "K" used for calculating the exposure values and the like. Thus, it is possible to determined the proper exposure value or exposure condition reflecting the user's taste and the experiences.

Although the present invention has been fully described by way of example with reference to the accompanying drawings, it is to be understood that various changes and modifications will be apparent to those skilled in the art without departing from the scope of the invention. Therefore, such changes and modifications are included within the scope of this invention.

What is claimed is:

1. An exposure meter comprising:
   a first meter portion measuring a first exposure value based on light incident on an object;
   a second meter portion measuring a second exposure value based on light reflected from the object; and
   a display portion showing the first and second exposure values for comparison thereof.

2. The exposure meter of claim 1, wherein the second meter portion measures at least one additional second exposure value based on the light reflected from the object and the display portion shows the second exposure values.

3. The exposure meter of claim 1, wherein the display portion shows at least the first exposure value or the second exposure value along an analog scale.

4. The exposure meter of claim 3, wherein the display portion shows the first and second exposure values on opposite sides of the analog scale, respectively.

5. The exposure meter of claim 3, wherein the display portion shows the first and second exposure values on one side of the analog scale.

6. The exposure meter of claim 3, wherein the display portion numerically shows the second exposure value.

7. The exposure meter of claim 1, wherein the display portion numerically shows the first and second exposure values.

8. The exposure meter of claim 1, wherein the display portion shows a range of exposure corresponding to a latitude of a light sensing member, the range being determined based on the first exposure value.

9. An exposure meter comprising:
   a first meter portion measuring a first exposure value based on light incident on an object;
   a second meter portion measuring a second exposure value based on light reflected from the object; and
   a calculator portion calculating a range of exposure corresponding to a latitude of a light sensing member based on the first exposure value.

10. The exposure meter of claim 9, further comprising a display portion showing the range of exposure.

11. The exposure meter of claim 10, wherein the display portion shows the second exposure value so as to be compared with the range of exposure.

12. The exposure meter of claim 11, further comprising an alarm unit that provides an alarm when the second exposure value is out of the range of exposure.

13. The exposure meter of claim 10, further comprising a viewfinder, wherein the display portion is provided in the viewfinder.

14. The exposure meter of claim 13, further comprising an alarm unit that provides an alarm when the second exposure value is out of the range of exposure, wherein the alarm unit is provided in the viewfinder.

15. The exposure meter of claim 9, further comprising a setting portion positioning the range of exposure with respect to the first exposure value based on a standard value.

16. The exposure meter of claim 9, further comprising a first adjuster adjusting a compensation factor used for calculating a the first exposure value, wherein the calculator portion calculates the range of exposure using the adjusted compensation factor.

17. The exposure meter of claim 16, further comprising a second adjuster adjusting a compensation factor used for calculating the second exposure value.

18. The exposure meter of claim 9, further comprising a range adjuster adjusting the range of exposure.

19. A method of measuring exposure of an object, comprising:

providing an exposure meter comprising a first meter portion measuring a first exposure value, a second meter portion measuring a second exposure value and a display portion showing the first and second exposure values for comparison thereof;

measuring the first exposure value based on light incident on the object using the first meter portion;

measuring the second exposure value based on light reflected from the object using the second meter portion; and comparing the first and second exposure values shown in the display portion to determine a photographic exposure condition of the object.

20. A method of measuring exposure of an object, comprising:

providing an exposure meter comprising a first meter portion measuring a first exposure value, a second meter portion measuring a second exposure value and a calculator portion for calculating a rage of exposure;

measuring the first exposure value based on light incident on the object using the first meter portion;

measuring the second exposure value based on light reflected from the object using the second meter portion; and calculating a range of exposure corresponding to a latitude of a light sensing member based on the measured first exposure value.

* * * * *